United States Patent
Bodkin, Sr.

[19]

[11] Patent Number: 5,827,564
[45] Date of Patent: Oct. 27, 1998

[54] BREAKFAST CEREAL WITH MILK PIECES

[76] Inventor: Lawrence Edward Bodkin, Sr., P.O. Box 16482, 1149 Molokai Rd., Jacksonville, Fla. 32216

[21] Appl. No.: 618,582

[22] Filed: Mar. 20, 1996

[51] Int. Cl.$^6$ .................................................... A23L 1/164
[52] U.S. Cl. .......................... 426/620; 426/64; 426/588; 426/106
[58] Field of Search .................................... 426/620, 621, 426/588, 64, 106

[56] References Cited

U.S. PATENT DOCUMENTS

| | | | |
|---|---|---|---|
| 2,835,586 | 5/1958 | Peeples | 426/588 |
| 3,080,235 | 3/1963 | Hodson | 426/588 |
| 3,876,811 | 4/1975 | Bonner et al. | 426/93 |

OTHER PUBLICATIONS

Compressing Spray–Dried Milk to Save Shipping Space, Webb, Food Industries, Sep. 1943 pp. 72–74.

*Primary Examiner*—Prince Willis, Jr.
*Assistant Examiner*—Robert R. Koehler
*Attorney, Agent, or Firm*—Arthur G. Yeager

[57] ABSTRACT

Aggregate pieces of instantized dry milk powder, which are uniformly distributed among cereal pieces in multi-serving packages of ready-to-eat breakfast cereal, tend to maintain their distribution by virtue of a size which is made comparable to that of the cereal pieces. The comparable sizes act to resist any sifting and settling separation and tend to provide a substantially uniform proportion of cereal and liquid milk in each serving, when water is added. An instantized dried milk powder, which is made potentially cohesive due to the inclusion of uncrystallized lactose or the addition of anhydrous sucrose, is then made into larger aggregate forms by substantially immediate compression after a small amount of moisture has been acquired by brief exposure in a humid atmosphere. These special aggregates, which are durable in the cereal package, quickly disintegrate in a sufficiency of cold water and revert to a readily dissolved and dispersible powder to furnish a liquid form of milk with minimal stirring. The aggregate pieces may also be made to resemble the shapes as well as the size of cereals to which they are added.

20 Claims, 1 Drawing Sheet

BREAKFAST CEREAL WITH MILK PIECES

TECHNICAL FIELD OF THE INVENTION

This invention relates to packaged, "ready-to-eat" breakfast cereals, particularly those packaged in multi-serving quantities, and to embodiments that implement the applicant's concept of providing a source of milk nutrition, an appearance of milk with the addition of water, and a substantially uniform and reasonably predictable proportioning of milk and cereal in each serving.

BACKGROUND OF THE INVENTION

Prepared, ready-to-eat cereals are primarily eaten as a convenience and provide excellent nutrition for those too busy to prepare or even to eat more elaborate breakfast fare. However, many of those who began eating prepared cereals as a convenience now regularly eat them because they have learned to prefer them to other breakfast options.

There are many substantial differences in the flavor, shape, color, texture, and nutritional values of the prepared cereals, and certain basic types enjoy the preference of large groups of consumers. Since this is a highly competitive business, even small modifying differences in flavor, texture, shape, color and nutritional qualities are continuously developed and intensively advertised in such a way as to make large differences in sales volume. The applicant believes that cereals that furnish their own milk, with the addition of water, will be welcomed by consumers and rapidly gain a lasting place in the market.

While some breakfast cereals have gained some additional acceptance as finger-food snacks, "ready-to-eat" cereals are generally not actually considered ready-to-eat until milk is added, which also provides a substantial amount of the total nutrition. Now, in accordance with this invention, there will be no need to add milk, only readily available water, to make such cereal truly ready-to-eat.

This very convenient means of providing milk for the breakfast cereals should be no reason for concern among those in the dairy industry, since they would still be supplying the breakfast milk, only the method of delivering it would differ. While dried milk is not limited to the non-fat or skim variety, the use of skim is preferred and would also tend to increase the total use of skim over whole milk, thus improving the breakfast diet and leaving more of the butterfat for the production of other dairy products.

SUMMARY OF THE INVENTION

In general, the applicant's concept of providing non-liquid milk and a means for the appearance of milk in the cereal package with the addition of water, requires an implementation beyond the simplest embodiment to qualify it for any widespread use in the cereal industry. This simplest embodiment of the concept, which is limited in use to the specialized single serving packages, calls for the addition of a prescribed amount of instantized dry milk powder to the cereal in the package. In a single serving instance, the separation of the milk powder from the cereal, by sifting of the smaller milk particles through the larger cereal pieces is of little concern to the consumer since proper proportioning of milk and cereal is assured by the single serving package, but it can complicate the packaging procedures by requiring an insertion separate from the cereal for a proper package proportioning. In the instance of the multi-serving packages, such sifting separation would be unacceptable to the consumer, since it would cause an extreme variance in the presence of milk in any particular serving.

To qualify for widespread use in the cereal industry, the applicant believes that a marketable means of including dry milk with cereal should meet the following criteria:

1. The dry milk must be made capable of ready solution and dispersion in cold water, with minimal stirring.

2. The dry milk should be maintained in a substantially even distribution within the package of cereal pieces in order to assure an acceptably uniform proportioning of milk and cereal in each serving.

3. The inclusion of milk should not require that the cereal be altered in appearance, so that it can be packaged with cereals which have established acceptance and which benefit from a valuable quality of visual recognition.

4. The cereal manufacturer's packaging procedures should suffer minimal, preferably negligible complication in accommodating the inclusion of milk in the cereal package.

Commercially available dry milk powder of the instantized type is capable of being rapidly dissolved and dispersed in cold water due to both its small particle form and an intrinsically porous and wettable structure, which may be the result of spray drying, rewetting, agglomeration and redrying or a more direct straight-through process.

While such powders are desirable in most repects, they tend to sift between the normally larger cereal shapes and eventually settle to the bottom of the package. A primary object of the applicant's invention is to provide a means for including such instantized milk powders in the cereal package in a form that resists the tendency to sift and separate.

Settling out of one material from another when both are represented by a large number of commingled solid pieces, is primarily a matter of comparative size rather than density, although shape can also be a consideration. Density is a prevailing factor where a liquid is involved, but it can be noted that small particles of cereal, which rub off from the larger pieces and normally equal the larger pieces in density, readily settle out in a cereal package.

This problem of separation is doubly important in the packaging of cereals, where the proposed addition of milk is concerned, since it affects not only the composition of the end product but, as previously mentioned, the complexity of its manufacture. When the milk can be added to the cereal in a way that can automatically maintain distribution, it can be simply added to and mixed with the bulk quantities of cereal before packaging. Packaging can then proceed in the conventional fashion. If the dry milk must be meted out separately to each package, as it must be in the instance of adding conventional milk powder to the single serving package, then another packaging operation is required. While the applicant's solution to the problems, in the special preparation of the milk product to be added, may also be considered an additional operation, it is not necessarily one for the cereal manufacturer and can be assumed by others, such as dried milk producers.

In accordance with the preferred embodiment of this invention, dry milk is commingled with cereal pieces in pieces much larger than the normal particle size of dried powdered milk which has been instantized. The purpose and function of the larger size is to prevent sifting and settling in the multi-serving package which would prevent the proper apportioning of milk in a serving of the cereal.

While there is no need for precision, where the size of the cereal pieces are made relatively uniform, the milk pieces should be made to compare favorably. Where the cereal unit size is variable, the size of the milk pieces need only be made substantial with regard to the average cereal piece to be functional in their resistance to settling. The milk pieces may be compact, or flattened and flake shaped and may generally be as variable as the shapes of the cereal. Unless the package is enlarged, the cost of including milk with cereal will be defrayed by the fact that the milk pieces will displace cereal pieces.

In the preferred embodiment of this invention, compactions of previously instantized milk powder particles provide durable, sifting resistant, larger pieces, without significant loss of the powder ability to be readily dissolved and dispersed in sufficient water. Some commercial powders, if not rendered less suitable by prior exposure to moisture, can be used without an additive. The milk particles are briefly stirred in a relatively warm, humid atmosphere, and then immediately compressed to form the aggregates. The humid atmosphere makes a very limited amount of moisture available to the surfaces of normally dry and non-adherent milk particles and enables them to become adhesive, or cohesive in the aggregate. However, if compression is not substantially immediate, additional moisture may be needed and an aggregate may be produced with less than ideal characteristics.

While various powders are commonly compressed into larger aggregate tablet forms in the pharmaceutical industry, with or without the aid of excipients, the size of milk powder aggregates is specialized, in accordance with the applicants invention, by being made to compare favorably with the size of the commingled cereal pieces to perform a mechanical function of resisting separation from cereal pieces during shipping and handling. The aggregate is further specialized by being made especially rapid in disintegration to powder form, in water, so that the inclusion of dry milk with cereal will be user acceptable.

Dry milk that may be processed to form cereal size pieces, without an additive, is typically a lower temperature type which has been spray dried, rewetted to a slurry, agglomerated to a coarse particle size and dried rapidly so that much of the lactose is preserved in a glassy rather than crystalline state. This makes it more than typically hygroscopic.

Milk powders given more time to crystallize their lactose before drying to reduce usually unwanted hygroscopicity or which otherwise fail to develop sufficient cohesivness after exposure in a humid atmosphere, may be used for aggregate manufacture by blending with sucrose that has had its water of crystalliztion driven off by boiling at high temperature. This anhydrous sugar is typically that of hard candy or of cotton candy and is made adhesive by very small quantities of water. The dry filamentous form of spun sucrose can be easily mixed with milk powder in a blender.

Both milk powder, with glassy lactose sugar, and milk powder blended with anhydrous sucrose, resist formation of a coherent mass without some addition of moisture. However, small amounts of water as a liquid, can cause powder particles to collapse their structure and coalesce into difficult to dissolve clumps. The humid atmosphere of aggregrate manufacture should therefore be devoid of water droplets. For reconstitution, the consumer is advised to add the prescribed amount all at once, to enhance solubility and dispersion.

Properly prepared milk pieces, made in accordance with the preferred embodiment of this invention, are remarkable in the speed of their disintegration and reversion to the powder state in sufficient water. For example, when a large piece is dropped into a standard size drinking glass filled with cold tap water, pieces made from powders which sink readily will tend to revert to powder form on or before reaching the bottom. Those which tend to float, disintegrate as rapidly at the surface. In either case, only a brief stirring is required to complete the task of dissolving and dispersing. Any adverse effect on rate of disintegration, attributable to prolonged exposure to the atmosphere, is avoided when milk pieces are packaged with a dry cereal, which is hermetically sealed to preserve freshness. The amount of dry milk included with the cereal should provide an acceptable quantity and quality of milk, when a recommended amount of water is added by the consumer.

True reconstitution of milk is complex and several hours are required after solution and dispersion for complete reconstitution of the proteins. This can affect taste, but it is unlikely to be noticed due to the typically more dominant flavors of the cereal.

The relative humidity of the atmosphere, relative temperatures of the powder and atmosphere, length of exposure of powder to atmosphere and degree of compression employed to form the milk pieces are all factors that affect both disintegration rate and resistance to attrition by cereal pieces. In general, the powder should be cool, and the atmosphere warm. A mild pressure, without kneading action, is preferred, and only enough moisture to establish a cohesive mass. The balancing of pressure and moisture required to obtain the ideal combination of dry durability and rapidity of disintegration in water is established empirically. Durability of milk pieces in the package is somewhat dependent upon properties of cereal pieces such as texture and resiliency, but a generally employable standard of density can be established. Size and shape are more often the greater considerations when making variations in the milk pieces to suit particular cereals.

A primary object of the invention is to provide those who enjoy ready-to-eat breakfast cereals with cereal that offers a self-contained source of liquid milk, obtainable with the simple addition of water.

Another object is to provide dried milk together with prepared cereal in a manner that maintains an originally established, substantially uniform distribution of milk and cereal within the mixture during shipping and handling so as to furnish a substantially uniform proportion of liquid milk when water is added to an individual serving.

Still another object is to accomplish the inclusion of milk within the cereal package without adversely affecting the appearance and texture of the cereal which may be well established and have considerable consumer appeal and acceptance.

An additional object is to provide a consumer recognizable source of milk for inclusion in a cereal package that is easily created by either the cereal or the dry milk processor.

A further object, in order to achieve the aforementioned objects, is to provide the means to produce aggregate pieces of instantized milk particles, which can be made comparable in size to cereal pieces with which they are to be commingled.

A still further object is to make such aggregate pieces durable enough to maintain their size after commingling with cereal pieces, yet be capable of a rapid disintegration in cold water, with minimal stirring.

A still further object is provide such aggregates of dry milk as uniformly quantified units, for inclusion with dry cereal pieces or for more general usage, which are readily disintegrated, dissolved and dispersed in water, by which the quantity of dry milk may be determined by simple count.

BRIEF DESCRIPTION OF THE DRAWINGS

The invention, both as to its organization and principles of operation, together with further objects and advantages thereof, may be better understood by reference to the following detailed description of the embodiments of the invention, taken in conjunction with the accompanying drawings in which.

DESCRIPTION OF THE PREFERRED EMBODIMENTS

Figure 1:
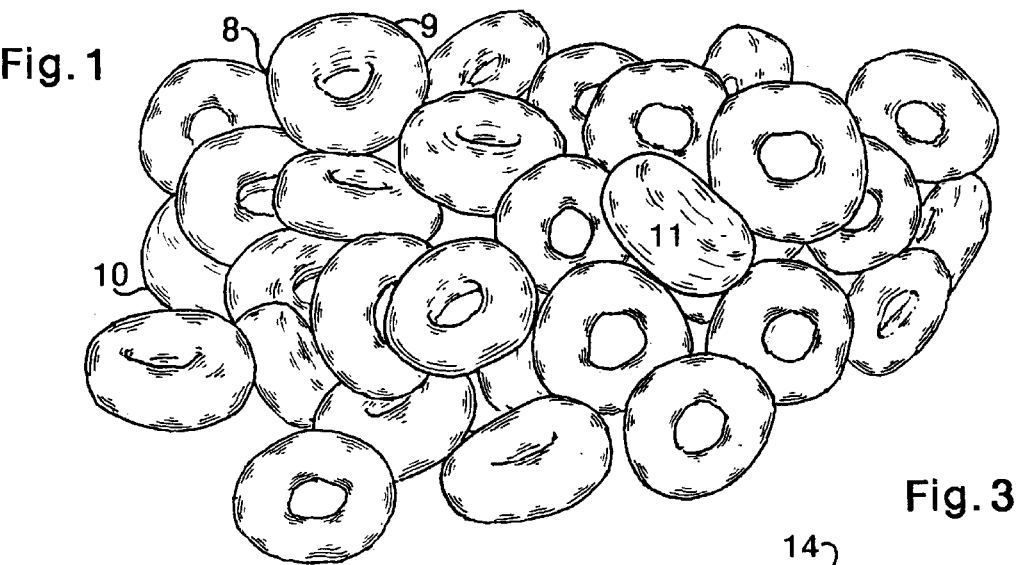
FIG. 1 depicts a quantity of prepared cereal, in a popular shape containing milk aggregates or milk pieces of a size and shape comparable to those of the cereal, that act to resist sifting and settling separation.

Referring first to FIG. 1, a quantity of cereal pieces indicated by 8, in a popular doughnut shape, has a representative piece indicated by 9 and is shown containing a distribution of milk pieces represented by 10 and 11, which are aggregates of instantized dried milk powder particles, made in accordance with this invention.

The milk pieces 10 & 11 have been made by molding, extruding or other pressure forming means, to resemble the cereal pieces in external size and shape, with elimination of the central cavity. The milk piece composition may consist of dry milk powder alone, or a blended mixture in which the dry milk cohesion is assisted by a relatively small addition of a sugar, which could simply be additional lactose in an uncrystallized state, but also a sugar other than lactose, such as anhydrous sucrose, as outlined in the foregoing summary or in the block diagrams of FIGS. 2 & 3.

Figure 2:
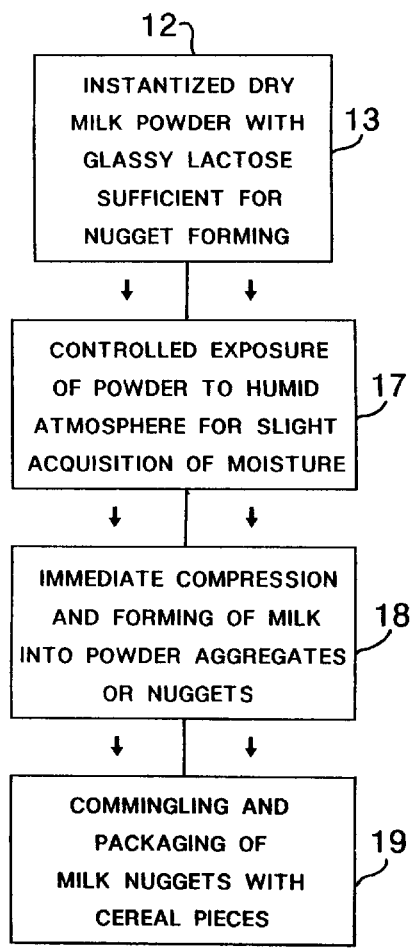
FIG. 2 is a block diagram illustrating the steps for forming a dry milk powder, with a suitable cohesive potential, into aggregate milk pieces for inclusion with cereal pieces, in accordance with this invention.

FIG. 2 shows steps for making aggregate milk pieces in the block diagram generally indicated by 12. These steps are for an instantized dry milk powder, without an additive, manufactured to have a relatively high content of uncrystallized lactose, and subsequently protected from acquisition of moisture additional to that present at the final drying stage.

Figure 3:
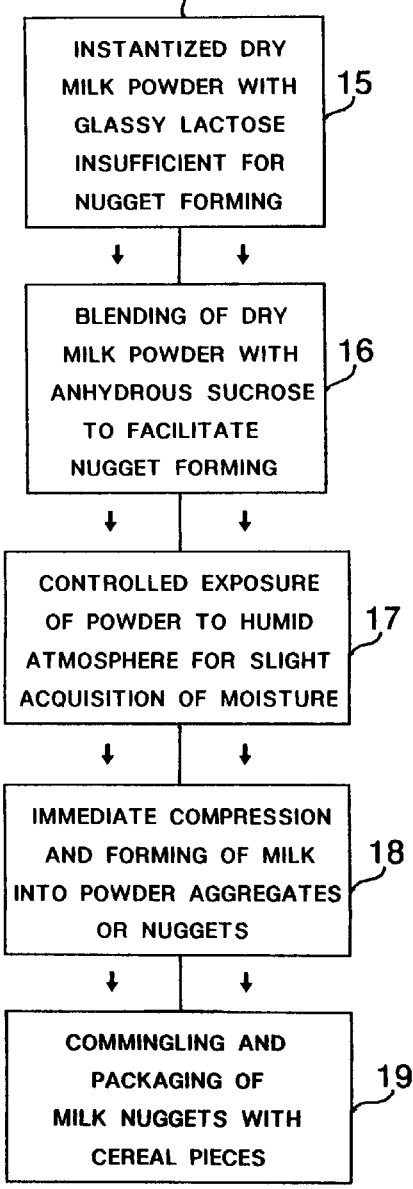
FIG. 3 is a block diagram illustrating the steps for forming a less suitable dry milk powder into such aggregate milk pieces with the assistance of an added, uncrystallized sugar.

In FIG. 3, steps similar to those of FIG. 2 are shown in the block diagram generally indicated by 14, but are for making instantized dried milk powder, which originally lacks the proper potential for cohesiveness, into aggregate milk pieces. This is accomplished with the addition of a sugar additional to the normal lactose.

Potentially cohesive milk particle surfaces may be produced by the characteristics of uncrystallized, glassy lactose, which is a form of the sugar that is an integral part of milk, as in FIG. 2, whether it is naturally present as a result of manufacturing conditions or due to addition after manufacture. But cohesiveness can also be effectively and efficiently produced by the characteristics of a sugar other than lactose, such as anhydrous sucrose, which can be blended with milk powder, as shown in FIG. 3. In either instance, the object is to obtain a serviceable degree of coherency with a minimal addition of moisture.

The milk of block 13 in diagram 12 of FIG. 2 is stirred, swirled or otherwise subjected to a brief but thorough exposure to a humid atmosphere, in block 17. This atmosphere must be substantially devoid of moisture droplets to avoid collapse of the powder structure and the development of difficult to dissolve clumps. The exposure is regulated to permit the powder to acquire a slight, predetermined amount of moisture suffficient only to the development of adhesive surfaces. The powder is then compressed with substantial immediacy as shown in block 18, to form the aggregates of instantized milk powder which are ready for commingling and packaging with cereal pieces of like size in block 19.

FIG. 3 shows a block diagram, generally indicated by 14, which displays the steps required for utilization of a milk powder that, due to an insuffficiency of glassy, uncrystallized lactose or some other factor, lacks the ability to develop an acceptable coherency with the acquisition of a slight amount of moisture. This powder is made to be potentially coherent by the blended addition of an uncrystallized sugar in block 16, which is typically hygroscopic, such as glassy state lactose or the anhydrous sucrose of cotton candy. Subsequent steps are those first shown in FIG. 2 and include controlled exposure of the milk powder to a humid atmosphere in block 17, compression forming of the milk powder into aggregate pieces in block 18 and subsequent commingling and packaging of cereal pieces with milk pieces of like size in block 19. A relatively direct compresssion that avoids any kneading action tends to preserve initially established cohesive bonds and produces milk pieces that have the advantage of a greater disintegration rate.

These milk pieces of larger size tend to resist sifting and settling separation from the cereal pieces and maintain an originally established, substantially uniform milk and cereal proportioning in the package to assure their proper proportioning in each serving. While size is a primary factor, the advantage of emulating cereal shapes is also recognized and is shown in FIG. 1. A prescribed density of distribution of the dry milk in the package, together with a recommended amount of water to be added per serving, provides both a proper concentration of milk constituents and a proper milk quantity per serving.

While the invention has been described with respect to certain specific embodiments, it will be appreciated that many modifications and changes may be made by those skilled in the art, without departing from the true spirit of the invention. It is intended therefore, by the appended claims, to cover all such modifications and changes as fall within the true spirit and scope of the invention.

What is claimed as new and what it is desired to secure by Letters Patent of the United States is:

1. In a package of dry ready-to-eat cereal pieces of a size substantially greater than the particle size of conventional instantized milk powders, the improvement comprising dry milk means for producing with a milky appearance of liquid milk upon water addition, said dry milk means being added to said cereal pieces in said package in substantially uniform proportions such that with each serving thereof from said package said substantially uniform proportions are maintained.

2. The package as defined in claim 1 wherein said dry milk means includes pieces of dry milk commingled with said cereal pieces, said milk pieces being made substantially larger than the particle size of conventional instantized milk powders, and said milk pieces being sufficiently large to inhibit sifting and settling separation of said milk pieces from said commingled cereal pieces.

3. The package as defined in claim 2 wherein said cereal pieces have a varied size and shape, said pieces of dry milk being aggregates of instantized dry milk powder having a size generally comparable to said size of said cereal pieces.

4. The package as defined in claim 3 in which said pieces of dry milk have a shape that resembles said shape of said cereal pieces.

5. The package as defined in claim 1 wherein said dry milk means is formed as durably coherent aggregates of instantized dry milk powder which readily disintegrate in cold water and revert to instantized powder which is readily dissolved and dispersed to produce a liquid form of milk.

6. The package as defined in claim 5 in which said coherent aggregates are formed from an instantized dry milk powder which contains uncrystallized, glassy lactose and which is compressed after it has been made coherent by acquisition of non-liquid moisture.

7. The package as defined in claim 6 in which said non-liquid moisture is provided by exposure to a humid atmosphere which is substantially devoid of water droplets.

8. The package as defined in claim 5 in which the said coherent aggregates are formed from an instantized dry milk powder by blending said powder with a sugar, and immediately compressing said blend of powder and sugar, after said blend has been made coherent by acquisition of non-liquid moisture.

9. The package as defined in claim 8 in which said sugar is anhydrous sucrose.

10. The package as defined in claim 8 in which said non-liquid moisture is acquired by exposure of said milk powder and said sugar blend to a humid atmosphere which is substantially devoid of water droplets.

11. A process for producing aggregates of instantized dried milk powder to be added to dry ready-to-eat cereal packages containing cereal of a size substantially greater than particle size of conventional instantized milk powders in which the aggregates are formed to have an increased volume, and to be readily disintegrated in sufficient water to revert to an instantized powder, said process comprising the sequential steps of subjecting the instantized dried milk powder to non-liquid moisture to render the instantized dry milk powder coherent, and immediately compressing the coherent instantized dry milk powder.

12. The process as defined in claim 11 wherein the step of subjecting is performed by exposure to a humid atmosphere which is substantially devoid of liquid water droplets.

13. The process as defined in claim 11 wherein the milk powder has substantial percentage of lactose sugar in an uncrystallized, glassy state.

14. The process as defined in claim 11, further comprising the step of blending the instantized dried milk powder with an added sugar.

15. The process as defined in claim 11, further comprising the step of blending the instantized dried milk powder with an anhydrous sucrose.

16. In a package containing a multi-serving quantity of ready-to-eat cereal pieces of a size substantially greater than the particle size of conventional instantized milk powders, the improvement comprising dry milk means to provide milk nutrition and to provide an appearance of liquid milk upon addition of sufficient water, said dry milk means being substantially uniformly distributed with said cereal pieces in order that each serving of said cereal pieces will contain a proportionate amount of said dry milk means.

17. In the package as defined in claim 16, wherein said cereal pieces have a varied size and shape, said dry milk means being in a form of easily disintegrated pieces, said easily disintegrated pieces being of a size that is generally comparable to said size of said cereal pieces.

18. In the package as defined in claim 17, in which said easily disintegrated pieces are durably cohesive aggregates of instantized milk powder.

19. In the package as defined in claim 18, in which said aggregates are formed from a milk powder made cohesive by containment of an uncrystallized sugar.

20. In the package as defined in claim 19, in which said uncrystallized sugar is anhydrous sucrose.

* * * * *